US 6,639,723 B2

(12) United States Patent  (10) Patent No.: US 6,639,723 B2
Maestle  (45) Date of Patent: Oct. 28, 2003

(54) VARIABLE OPTICAL ATTENUATOR WITH POLARIZATION COMPENSATION

(75) Inventor: Ruediger Maestle, Boeblingen (DE)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/047,133

(22) Filed: Jan. 15, 2002

(65) Prior Publication Data

US 2002/0196539 A1 Dec. 26, 2002

(30) Foreign Application Priority Data

Jun. 22, 2001 (EP) .............................. 01115142

(51) Int. Cl.[7] .............................. G02B 5/08; G02B 27/00
(52) U.S. Cl. .................. 359/578; 359/577; 359/885; 359/887; 359/888; 359/890; 359/900
(58) Field of Search ................................. 359/577, 578, 359/579, 900

(56) References Cited

U.S. PATENT DOCUMENTS

| 3,914,016 A | * | 10/1975 | Dreyer ...................... 349/194 |
| 4,398,806 A | | 8/1983 | Bennett et al. |
| 6,266,474 B1 | * | 7/2001 | Han et al. .................. 385/140 |
| 6,347,164 B1 | * | 2/2002 | Rudkevich .................. 385/11 |
| 6,404,970 B1 | * | 6/2002 | Gransden et al. ........... 385/140 |

FOREIGN PATENT DOCUMENTS

| EP | 0 557 542 A1 | | 9/1993 |
| JP | 59223401 | | 12/1984 |
| JP | 07294742 | | 11/1995 |
| JP | 07-294742 A | * | 11/1995 |

OTHER PUBLICATIONS

Von Moers, F., Examiner. European Search Report, Application No. EP 01 11 5142, dated Nov. 30, 2001.

* cited by examiner

Primary Examiner—John Juba

(57) ABSTRACT

An optical attenuator for attenuating an incident optical beam comprises at least two attenuating devices, each having a polarization dependent attenuation characteristic with a preferred orientation. The attenuating devices are arranged in the optical beam in a way that the preferred orientations of the polarization dependent attenuation characteristics substantially compensate each other, at least partially in defined locations. At least one attenuating device provides an attenuation characteristic wherein the attenuation for the incoming light beam varies in a defined direction. The preferred orientation of the polarization dependent attenuation characteristic of the at least one attenuating device is substantially in the same direction as the varying attenuation characteristics or substantially perpendicular thereto.

9 Claims, 3 Drawing Sheets

VARIABLE OPTICAL ATTENUATOR WITH POLARIZATION COMPENSATION

BACKGROUND OF THE INVENTION

The present invention relates to optical attenuators.

In typical optical attenuators, as disclosed e.g. in EP-A-557542, an incoming optical beam is passed through an attenuation device with a defined transmission characteristic. Varying the transmission characteristic can control the amount of attenuation.

Polarization-compensated attenuators are known e.g. from U.S. Pat. No. 4,398,806, JP-A-07 294742, or JP-A-59 223401.

In some variable optical attenuators using attenuating devices with varying optical thickness for achieving varying attenuation properties, it has been found that polarization dependent loss (PDL) also increases with increasing attenuation. This is due to surface properties or internal structures of the attenuation device having preferred polarization orientations and resulting e.g. from the applied manufacturing process, such as surface or internal structures with preferred orientations resulting from e.g. metal deposition or surface texturing process.

SUMMARY OF THE INVENTION

It is an object of the present invention to provide an optical attenuator with improved polarization dependent attenuation characteristic. The object is solved by the independent claims. Preferred embodiments are shown by the dependent claims.

According to the present invention, an optical attenuator for attenuating an incoming optical beam comprises at least two attenuating devices, each having a polarization dependent attenuation characteristic with a preferred orientation. In other words, each attenuating device provides a polarization dependent attenuation characteristic, so that the transmission rate of each attenuating device depends on the state of polarization of the incident light. The polarization dependent attenuation characteristic is generally represented in a diagram showing the polarization dependency for the different states of polarization of the incident light. A preferred orientation for the polarization dependent attenuation means that the polarization dependent attenuation in a first direction (perpendicular to the propagation direction of the incident light beam) is smaller than the polarization dependent attenuation in a second direction perpendicular to the first direction (and to the propagation direction of the incident light beam). In case that the attenuating device has such preferred orientation for the polarization dependent attenuation, the polarization dependent attenuation characteristic has an elliptical shape with the first orientation as one main axis and the second orientation as the other main axis. A circular polarization dependent attenuation characteristic, however, means that the polarization dependent attenuation is exactly the same for all states of polarization of the incident light beam. This also means that there is no polarization dependent loss.

The at least two attenuating devices are arranged in a way that the preferred orientations of the polarization dependent attenuation characteristics substantially compensate each other, at least partially in defined locations. Thus, the polarization dependent attenuation characteristic for the at least two attenuating devices together becomes substantially circular, at least in the defined locations, so that there is substantially no polarization dependent loss. These defined locations of substantially no polarization dependent loss can be a line (e.g. a line of intersection) or an area, having any possible shaping dependent on the specific characteristics of the attenuating devices and their spatial arrangement with respect to each other.

In a preferred embodiment, each attenuating device provides an attenuation characteristic wherein the attenuation for the incident light beam varies in a defined direction. The preferred orientation of the polarization dependent attenuation characteristic of each attenuating device is substantially in the same direction as the varying attenuation characteristics or substantially perpendicular thereto. The attenuating devices are arranged that the respective directions of the varying attenuation characteristics are tilted with respect to each other, so that the preferred orientations of the polarization dependent attenuation characteristics substantially compensate each other resulting in a substantially compensated polarization dependent attenuation characteristic of the attenuating device at least along a defined direction of intersection.

In a preferred embodiment, the optical attenuator comprises n attenuating devices, with n=2, 3, 4, . . . . The n attenuating devices are substantially equal in characteristic having substantially the same polarization dependent attenuation characteristic. The directions of the preferred orientations of the polarization dependent attenuation characteristics are arranged tilted with respect to each other each in an angle of $180°/n$. In the ideal case wherein the n attenuating devices have exactly the same characteristics, the elliptical polarization dependent attenuation characteristics of each of the n attenuating devices exactly superimpose to a circular polarization attenuation characteristic of the attenuating device.

In case that each of the n attenuating devices with substantially the same characteristic also have varying attenuation characteristics in defined orientations, it becomes clear that a substantially compensated polarization dependent attenuation characteristics can only be found along a crossing or intersection line or curve, where also the attenuation characteristics of the n attenuating devices substantially match, in case the polarization dependent attenuation characteristic is dependent on the varying attenuation characteristic.

One or more of the attenuating devices may also be tilted with respect to the incident optical beam in order to (further) reduce reflection effects.

It is clear that the attenuating devices need not necessarily be individual or physically separated devices, but can also be physically combined or attached with each other. The attenuating 'devices' might also result from one manufacturing process, so that there might not be individual 'devices'. The term 'device' as used here has to be interpreted in its broadest sense and is characterized more in the direction of common physical properties than in the direction of physically individual and separated units. In its broadest interpretation, the effect of substantial compensation of polarization dependent loss according to the present invention can also be achieved by providing multiple attenuation 'devices' with different orientations for the polarization dependent attenuation characteristics in order to achieve a resulting polarization dependent attenuation characteristic substantially without orientation.

In a preferred embodiment, one or more of the attenuating devices are embodied as layers, such as metallic layers e.g. resulting from metal deposition process. The layers can be individual layers or 'interwoven' with each other, e.g. resulting from a common manufacturing process, so that the 'layers' are not physically separated from each other. One or more of such layers might be provided (e.g. coated) on a substrate.

BRIEF DESCRIPTION OF THE DRAWINGS

Other objects and many of the attendant advantages of the present invention will be readily appreciated and become better understood by reference to the following detailed description when considering in connection with the accompanied drawings. Features that are substantially or functionally equal or similar will be referred to with the same reference sign(s).

DETAILED DESCRIPTION OF THE INVENTION

Figure 1:
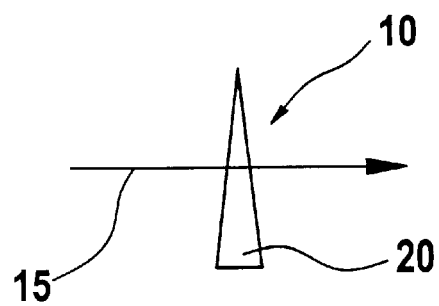
FIG. 1 shows a variable optical attenuator 10.

FIG. 1 shows a variable optical attenuator 10. An incoming light beam 15 is passed through an attenuation device 20 attenuating the optical power of the incoming optical beam. Other optical components or devices might further be applied, e.g. for directing or collimating the optical beam, however, which are not of specific interest here and are disclosed e.g. in the aforementioned EP-A-557542 or in the European Patent Application No. 01108455.5. The attenuation device 20 provides a varying attenuation dependent on a varying thickness relative to the incoming optical beam.

Figure 2A:
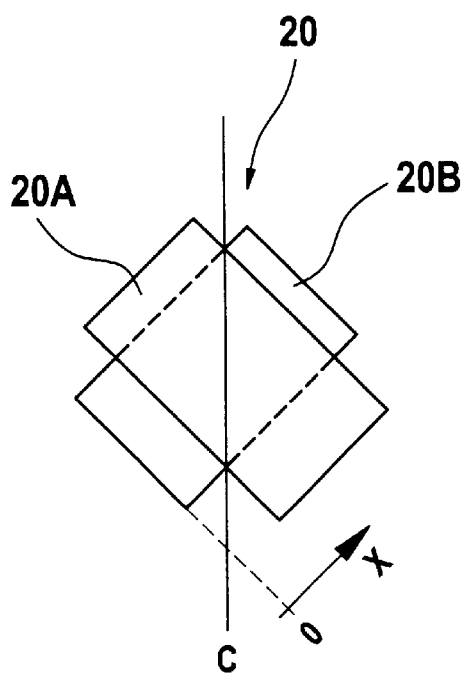
FIGS. 2A and 2B illustrate the principle of the present invention.
Figure 2B:
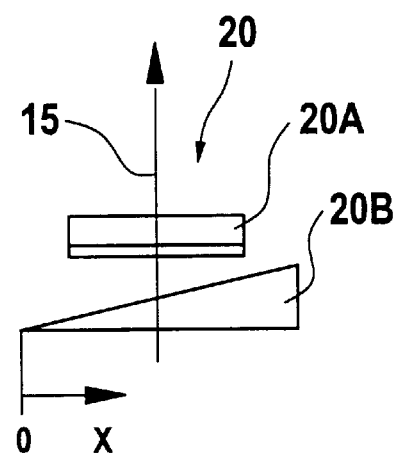

FIGS. 2A and 2B illustrate the principle of the present invention. The attenuation device 20 comprises a first attenuating device 20A and a second attenuating device 20B. While FIG. 2A shows the attenuation device 20 seen from the propagation direction of the optical beam 15, FIG. 2B shows the attenuation device 20 in the same area as in FIG. 1 and perpendicular to the illustration of FIG. 2A. The attenuating devices 20A and 20B have substantially the same characteristics but are tilted with respect to each other by 90°.

Figure 3A:
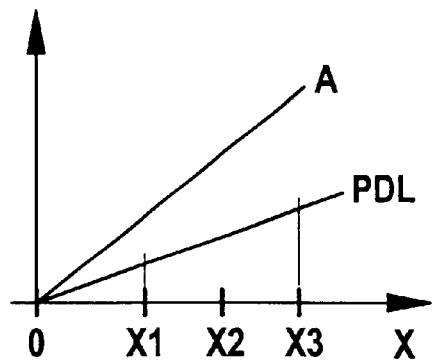
FIGS. 3A and 3B show typical characteristics of attenuation and polarization dependent attenuation.

FIG. 3A shows—as an example for the attenuating device 20B—typical characteristics of attenuation and polarization dependent loss (PDL). The values of both, attenuation A and PDL, increase with increasing values for x. The characteristics of attenuation and PDL for the attenuating device 20A substantially corresponds to FIG. 3A, however adapted to its tilting.

Figure 3B:
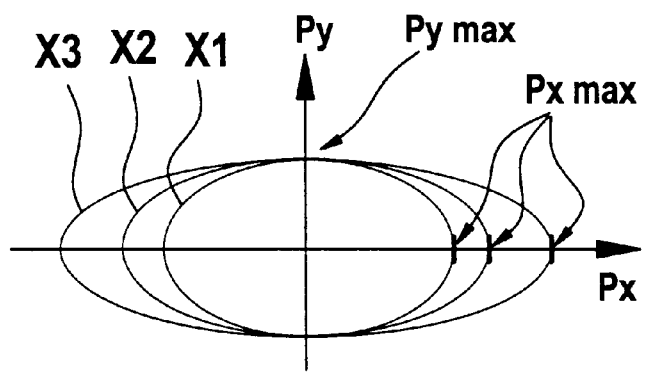

The PDL of the attenuation device 20B (and accordingly 20A) results from an elliptical shape of the polarization dependent transmission characteristics for the incoming beam. FIG. 3B illustrates the principle variation for the elliptic shapes of the polarization dependent attenuations for examples at locations $x_1$, $x_2$, and $x_3$ (as indicated in FIG. 3A). The value of PDL results for each location $x_i$ along the x-axis from the formula:

$$PDL(x_i) = Px\ max(x_i)/Py\ max(x_i).$$

In case the attenuating devices 20A and 20B result from a metal coating process with increasing coating thickness along the x-axis, the increasing values of PDL are effected by internal metal structures having increasing preferred polarizing orientation with increasing thickness.

In case the two attenuating devices 20A and 20B have the same characteristics of attenuation and polarization dependent attenuation, the two substantially identical ellipses, but tilted by 90° with respect to each other, will superimpose to a circle along a line (or curve) C as indicated in FIG. 2A. The line C represents the locations where the values of attenuation and the elliptical shapes of the direction sensitive polarization of both the first and second attenuating devices 20A and 20B substantially match.

In case (not shown in the Figures) that three different attenuating devices 20A, 20B and 20C are used, the attenuating devices 20A, 20B, 20C are tilted with respect to each other by 60°. Accordingly, when applying n identical attenuation devices 20i (with i=A, B, . . . , N), the tilting angle should be selected to 180°/n.

Figure 4A:
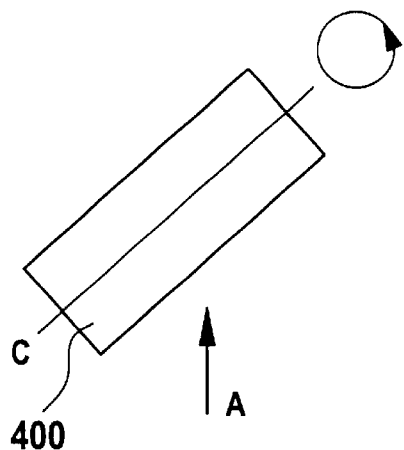
FIGS. 4A–4C show preferred embodiments for providing the attenuation device 20.
Figure 4B:
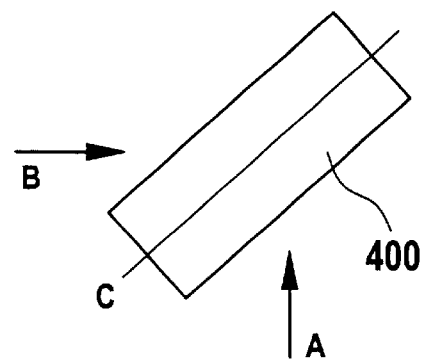
Figure 4C:
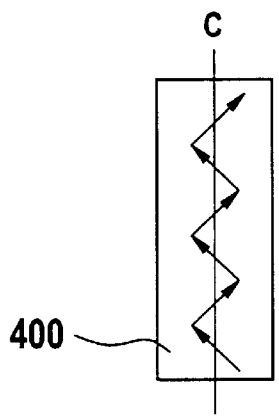

FIGS. 4A–4C show preferred embodiments for providing the attenuation device 20 with two different attenuating devices corresponding to the attenuating devices 20A and 20B as illustrated in principle in the FIGS. 2A and 2B.

In FIG. 4A, a substrate 400 is first coated in a direction A, which is tilted 45° with respect to the substrate 400. This first coating step results in the first attenuating device 20A with varying thickness and thus varying attenuating characteristic substantially corresponding in function with the first attenuating device 20A. The substrate 400 is then turned by 180° onto its opposite side and the same coating process is repeated, again in the direction A. This second coating corresponds in function with the second attenuating device 20B. Thus, the substrate 400 will bear two identical coatings on each side, however, tilted by 90° with respect to each other. The line C of substantial PDL compensation will be found in the middle of the substrate 400 as indicated in FIG. 4A.

In FIG. 4B, the substrate 400 is first coated in the direction A, and concurrently or afterwards in a direction B perpendicular to direction A. In that case, both coatings will be on the same surface of the substrate 400, and the line C will again be in the middle of the substrate 400.

Either the substrate 400 or a coating source can be also be tilted during the deposition process. In FIG. 4C, the coating is first deposited in a direction 45° tilted with respect to the substrate. The coating direction will then successively or continuously turned by 90° as indicated by the arrows in FIG. 4C.

What is claimed is:

1. An optical attenuator for attenuating an incident optical beam comprising:
    at least two attenuating devices, each having a polarization dependent attenuation characteristic with a preferred orientation, the at least two attenuating devices being arranged in the optical beam in a way that the preferred orientations of the polarization dependent attenuation characteristics substantially compensate each other, at least partially in defined locations,
    wherein at least one attenuating device provides an attenuation characteristic wherein the attenuation for an incoming light beam varies in a defined direction, and the preferred orientation of the polarization dependent attenuation characteristic of the at least one attenuating device is substantially in the same direction as the varying attenuation characteristics or substantially perpendicular thereto.

2. The optical attenuator of claim 1, wherein the polarization dependent attenuator characteristic for the at least two attenuating devices together becomes substantially circular, at least in the defined locations, so that there is substantially no polarization dependent loss.

3. The optical attenuator of claim 1, wherein each attenuating device provides a polarization dependent attenuation characteristic, so that the transmission rate thereof depends of the state of polarization of the incoming light beam, and wherein the polarization dependent attenuation in a first direction perpendicular to the propagation direction of the incoming light beam is smaller than the polarization dependent attenuation in a second direction perpendicular to the first direction and to the propagation direction of the incoming light beam.

4. The optical attenuator according to claim 1, wherein each attenuating device provides an attenuation characteristic wherein the attenuation for the incoming light beam varies in a defined direction, the attenuating devices being arranged that the respective directions of the varying attenuation characteristics are tilted with respect to each other, so that the preferred orientations of the polarization dependent attenuation characteristics substantially compensate each other resulting in a substantially compensated polarization dependent attenuation characteristic of the attenuating device at least along a defined direction of intersection.

5. The optical attenuator according to claim 1, comprising n attenuating devices, with n=2, 3, 4, . . . , being substantially equal in attenuation characteristic and having substantially the same polarization dependent attenuation characteristic, wherein the directions of the preferred orientations of the polarization dependent attenuation characteristics are arranged tilted with respect to each other each in an angle of substantially 180°/n.

6. The optical attenuator according to claim 1, wherein at least one of the attenuating devices is a layer or results from a deposition or coating process.

7. A method for providing an optical attenuator for attenuating an incident optical beam, the method comprising:

provided a first attenuating device having a polarization dependent attenuation characteristic with a first preferred orientation substantially in the same direction as a varying attenuation characteristic of the first attenuating device or substantially perpendicular thereto, and providing a second attenuating device having a polarization dependent attenuation characteristic with a second preferred orientation substantially in the same direction as a varying attenuation characteristic of the second attenuating device or substantially perpendicular thereto, whereby the two attenuating devices are arranged with respect to each other in a way that the preferred orientations of the polarization dependent attenuation characteristics substantially compensate each other, at least partially in defined locations.

8. A method for manufacturing an optical attenuator for attenuating an incident optical beam, the method comprising:

depositing or coating a first attenuating material in a way that a polarization dependent attenuation characteristic with a first preferred orientation substantially in the same direction as a varying attenuation characteristic of the first attenuating material or substantially perpendicular thereto results, and depositing or coating a second attenuating material in a way that a polarization dependent attenuation characteristic with a second preferred orientation substantially in the same direction as a varying attenuation characteristic of the second attenuating material or substantially perpendicular thereto results, whereby the directions of the two depositing or coating steps are arranged with respect to each other in a way that the preferred orientations of the polarization dependent attenuation characteristics substantially compensate each other, at least partially in defined locations.

9. A method for manufacturing an optical attenuator for attenuating an incident optical beam, the method comprising:

depositing or coating one attenuating material with an attenuation characteristic varying in a first direction; and depositing or coating said material with an attenuation characteristic varying in a second direction, wherein resulting orientations of polarization dependent attenuation characteristics substantially compensate each other, at least partially in defined locations.

* * * * *